Jan. 19, 1965 W. J. STRONG 3,166,681

MEMORY READOUT SENSING CIRCUIT EMPLOYING CLIPPING-CLAMPING NETWORK CONNECTED TO STROBED LOGIC AND GATE

Filed Nov. 7, 1962 2 Sheets-Sheet 1

INVENTOR.
WILLARD J. STRONG
BY John R. Faulkner
John A. Duffy
ATTORNEYS

WILLARD J. STRONG
INVENTOR.
BY John R. Faulkner
John A. Duffy
ATTORNEYS

United States Patent Office 3,166,681
Patented Jan. 19, 1965

3,166,681

MEMORY READOUT SENSING CIRCUIT EMPLOYING CLIPPING-CLAMPING NETWORK CONNECTED TO STROBED LOGIC AND GATE

Willard J. Strong, Costa Mesa, Calif., assignor to Ford Motor Company, Dearborn, Mich., a corporation of Delaware Filed Nov. 7, 1962, Ser. No. 235,957
5 Claims. (Cl. 307—88.5)

Figure 1:
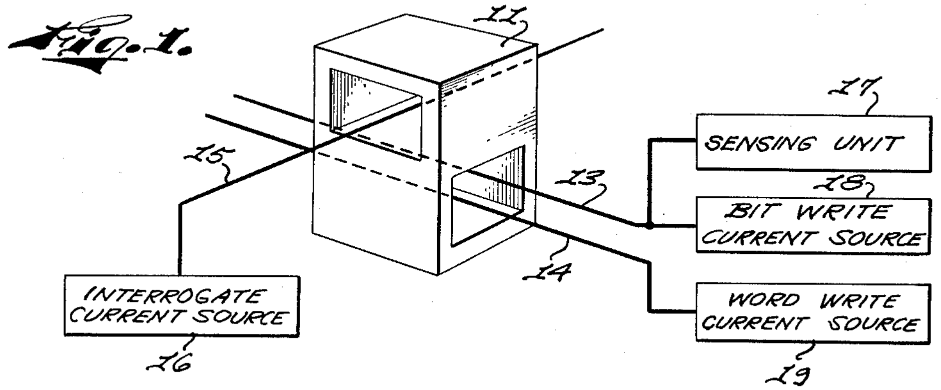

This invention relates to memory readout sensing circuits and more particularly to a sense amplifier for determining flux storage conditions in a block of magnetic material.

In magnetic circuits utilizing magnetic core elements data is stored and processed by means of interaction between electronic circuitry and magnetic core elements. Information is read out of a magnetic core element by means of a sensing conductor which has induced therein an electrical signal by a change in flux storage condition in the block of magnetic material. The electrical signal induced in the sensing conductor is then fed to readout circuitry for further data processing. In storage systems wherein the output of the sense winding is bipolar the sense winding has induced therein a substantially sine wave signal with a positive pulse followed by a negative pulse indicative of a ONE state of storage and a negative pulse followed by a positive pulse indicative of the other state of storage. Therefore, it is necessary for the sensing circuit to determine from the sine wave signal the state of storage in the magnetic core element.

Circuits for determining the storage state in a magnetic core element providing a substantially sine wave signal in the sensing conductor have been unable to determine with any degree of simplicity or accuracy the desired condition. Present day circuitry is complicated and unreliable in the comparison between the bipolar signal indicating a ONE condition in the element and a bipolar signal indicating a ZERO condition. Further, in many storage elements it is desirable to induce a low signal strength signal in the sensing conductor. Present day circuitry has been unable to produce a sufficiently high signal to noise ratio from the low strength signal at the sensing conductor. It is therefore an object of this invention to provide an improved memory readout sensing circuit.

The memory readout sensing circuit of this invention contemplates as a material feature thereof a sensing circuit which is responsive to the bipolar output of a sensing conductor associated with a magnetic storage element to provide at its output a signal indicative of a storage condition in the magnetic storage element. According to the invention a sensing means is provided which includes a differential amplifier means responsively connected to the sense winding of the storage element for amplifying the difference between the positive and negative halves of the signal induced in the sense winding. Clamping means responsively connected to the output of the amplifier means clip the negative half of the sine wave signal. The output of the clamping means is a positive signal for either storage conditions in the magnetic storage element. Gating means are provided having one input responsively connected to the output of the clamping means and the other input responsively connected to receive its signal from a source of time strobe pulses. The signal from the time strobe pulse source is in time coincidence with the first half of the sine wave signal. In this manner, the gating means delivers an output only when the first half of the sine wave signal is positive, thereby providing an indication of the storage condition of the magnetic storage element.

It is therefore another object of this invention to provide a sensing circuit for determining flux storage conditions in a block of magnetic material providing a bipolar output at its sensing means.

It is another object of this invention to provide a sensing circuit responsive to a sense winding in a block of magnetic material for providing a signal indicative of the polarity of flux storage in the magnetic storage element.

It is a further object of this invention to provide a sensing circuit for determing flux storage conditions in a block of magnetic material and providing an output signal of high signal to noise ratio.

Figure 2:
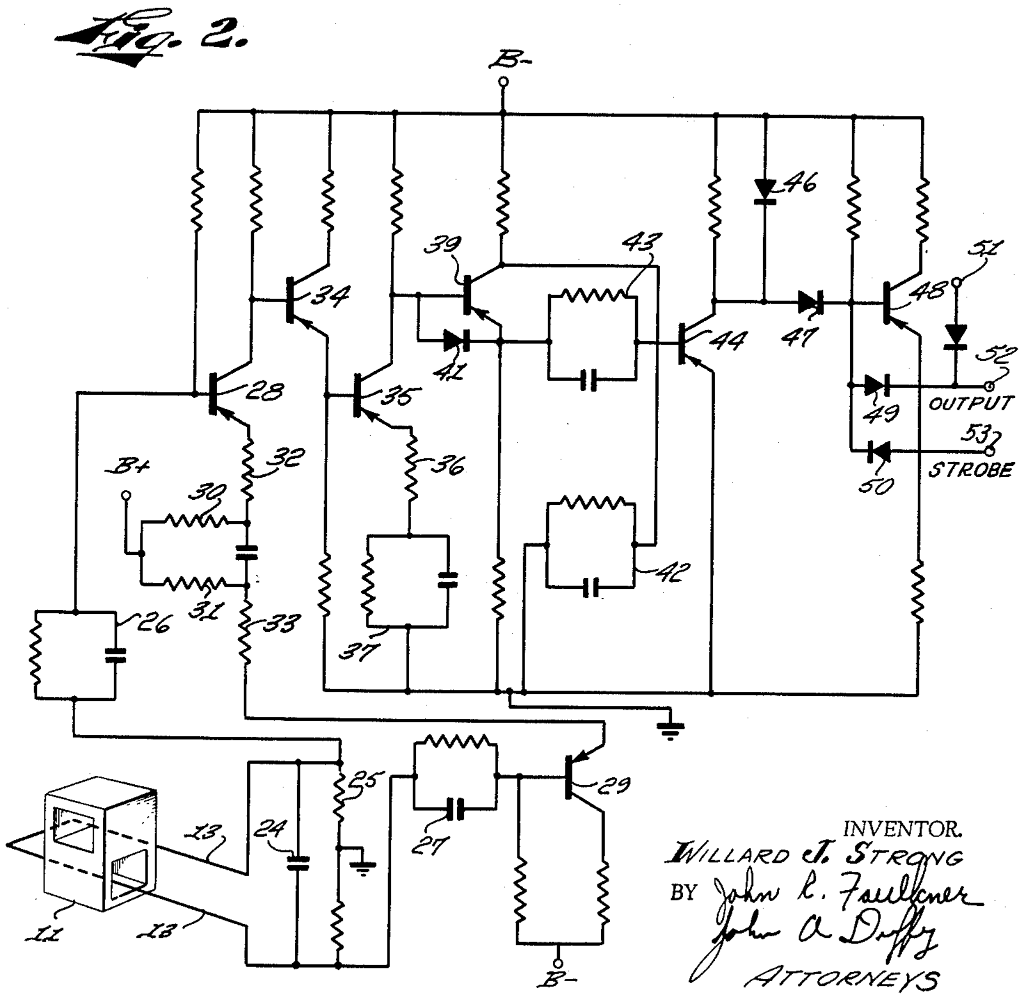
Figure 3:
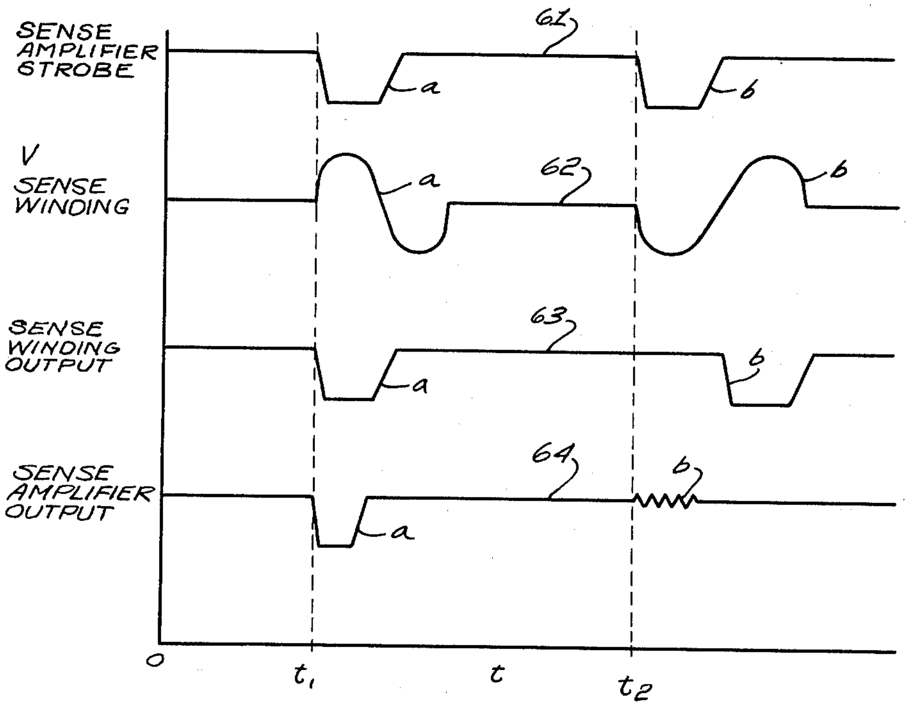

Other objects of the invention will become apparent from the following description read in conjunction with the accompanying drawings, in which:

FIG. 1 is a block diagram illustrating one application of the sense winding of the invention with a magnetic storage element, FIG. 2 is a schematic diagram of a circuit embodying the features of the magnetic readout sensing circuit of the invention, and FIG. 3 illustrates wave forms of the sensing circuit of FIG. 2.

According to a principal aspect of the invention the bipolar output in the sense winding associated with the magnetic storage element is amplified by a differential amplifier which amplifies the difference between the positive and negative halves of the output. The negative half of the bipolar output of the differential amplifier is clipped with the resulting positive half signal fed to one input of an AND gate. The other input of the AND gate is a signal from a source of time strobe pulses with the AND gate providing an output indicative of coincidence between the first half of the signal output from the sense winding and the time strobe pulse when the storage condition of the magnetic core element is in a ONE state. When the storage condition of the magnetic core element is in a ZERO state, the time strobe pulse occurs subsequent to the pulse from the sense winding with the AND gate providing no output signal due to the absence of the time coincidence of the input signals thereto.

Referring now to the drawing, and more particularly to FIG. 1, there is illustrated a block 11 of magnetic material which may comprise the magnetic storage element to be sensed by the sensing circuit of the invention. The core element 11 may comprise a core element as utilized in a copending application, Serial Number 61,722, Write Interrogate Memory System, which is assigned to the assignee of the present application. The pending application illustrates a memory system having a plurality of magnetic core elements each having a pair of orthogonally disposed openings for providing nondestructive storage of digital information. The core element 11 has a pair of orthogonally disposed openings passing therethrough perpendicular to each other. The upper opening has an interrogate conductor 15 responsively connected to an interrogate current source 16. The lower opening has positioned therein conductors 13 and 14. The conductor 13 is responsively connected to a sensing unit 17 and a bit write current source 18 and the conductor 14 is responsively connected to a word write current source 19. Information is stored in the element of FIG. 1 by providing current pulses through conductors 13 and 14 from write current sources 18 and 19. Information is read from the element 11 by the sensing unit 17 which is responsive to signals in the conductor 13. Thus, according to the teaching in the above-mentioned copending application, the signal in the conductor 15 from the interrogate current source 16 causes a signal to be induced in the conductor 13 which is fed to the sensing unit 17.

The signal induced in the conductor 13 is bipolar and of substantially sine wave configuration.

Referring now to FIG. 2, there is illustrated a sensing circuit according to the invention which may comprise the sensing unit 17 of FIG. 1. In FIG. 2, the sense conductor 13 of the storage element 11 is connected across a differential amplifier including the transistors 28 and 29. The transistor 28 is connected to receive a B+ potential through resistors 30 and 32 at its emitter electrode and a B− potential at its collector electrode. The transistor 29 is connected through resistors 31 and 33 to a B+ with its collector connected to a B− potential. The signal from the sense winding 13 is connected across the inputs of transistors 28 and 29. A resistor-capacitor circuit comprising a capacitor 24 and resistors 25 and 26 is connected across the winding 13 to match the impedance of the winding 13 and filter out undesirable noise. In other words, the sense winding 13 is terminated by the resistor-capacitor circuit which serves to match the impedance of the sense winding 13 as well as filter out undesirable signals. A resistor-capacitor circuit 26 couples one end of the sense winding 13 to the base of the transistor 28 and the other end of winding 13 is connected through a resistor-capacitor circuit 27 to the base of the transistor 29. The emitter resistors 32 and 33 of the transistors 28 and 29 respectively supply negative current feedback to the transistors. The resistors 30 and 31 are respectively connected to resistors 32 and 33 and to a B+ potential to provide a high degree of direct current stability and a high common mode noise rejection. The differential amplifier of transistors 28 and 29 amplifies the difference between the positive and negative half portions of the signal across the sense winding 13. For example, if the inputs to the transistors 28 and 29 from the sense winding 13 are $V_1$ and $V_2$, the output at the collector of transistor 28 is equal to $K(V_1-V_2)$ where K is a constant determined by the gain of the transistors 28 and 29.

The single ended output of the differential amplifier is taken from the collector of the transistor 28 and applied to the base of a transistor 34 which operates as an emitter follower. The output at the collector of the transistor 28 is a bipolar signal of substantially sine wave form. If the signal is a positive pulse followed by a negative pulse, this may be indicative of a ONE stored in the element 11 and if the signal is a negative pulse followed by a positive pulse, it may be indicative of a ZERO stored in the element 11. The emitter follower transistor 34 presents a high impedance load to the output of the differential amplifier of transistors 28 and 29, and a low impedance source to the following stage. The output of the emitter follower transistor 34 taken at the emitter of transistor 34 is supplied to the base of a transistor 35 which operates as a linear class A amplifier. The transistor 35 is biased to an operating point approximately in the middle of its load line to provide the linear class A amplifier operation over a wide range of input signal amplitude. The transistor 35 has a negative current feedback emitter resistor 36 connected between the emitter of transistor 35 and a resistor-capacitor 37 to ground. The resistor 36 compensates for beta variations in the transistor 35 and the emitter resistor-capacitor circuit 37 operates to set the proper D.C. operating point of the transistor 35.

The output of the transistor 35 taken from its collector is applied to the base of a transistor 39 which acts as an emitter follower. The transistor 39 has its collector connected through a resistor to a B− potential and its emitter connected through a resistor to a ground potential. A clamping resistor-capacitor circuit 42 connected between the collector of the transistor 39 and ground operates to clip the negative going portion of the signal applied to the base thereof with the positive portion of the signal from the output of transistor 35 appearing at the emitter of the transistor 39. Thus, for example, if the signal stored in the element 11 is a ONE, the positive portion will be during the first half of the signal, while if the signal stored is a ZERO, the positive portion will occur during the last half of the signal at the emitter of the transistor 39. The output of the transistor 39 is taken at its emitter and coupled through a resistor-capacitor circuit 43 to the base of a transistor 44 which operates as a saturated switch normally biased to a conducting state requiring a positive signal to turn it off when it delivers a negative going pulse at its output collector circuit. The output of the transistor 44 is clamped to a B− potential through a diode 46 so that the collector of the transistor 44 swings from a ground potential to a B− potential when the transistor 44 is momentarily turned off by a positive signal received at its base from the emitter of the transistor 39.

An AND gate comprising diodes 47, 49, and 50 has an input at the diode 47 responsive to the output of the transistor 44 at its collector and an input at the diode 50 responsive to a source of strobe pulses received at a terminal 53. The strobe pulses received at the terminal 53 are adapted to be controlled so as to arrive at the diode 50 in time coincidence with the first half of the bipolar signal from the sense winding 13. Thus, if the signal stored in the element 11 is a ONE, and the positive portion of the signal at the winding 13 is during the first half of the signal, the output of the transistor 44 at the diode 47 occurs in time coincidence with the strobe pulse to the input of the diode 50 from the terminal 53. Coincidence of signals at the diode 50 and the diode 47 provides a signal through the diode 49 to the output terminal 52. The transistor 48 having its emitter connected to the output terminal 52, and the output of the diode 49 acts as a high impedance load to the AND gate of diodes 47, 49, and 50, and a low impedance source to the terminal 52. The terminal 52 providing a positive signal indicative of a stored ONE in the element 11, and no signal indicative of a stored ZERO in the element 11, then may be presented to further data processing devices of the system.

Referring now to FIG. 3, there is illustrated wave forms of the signals of the sensing circuit of FIG. 2. In FIG. 3, the wave form 62 illustrates the output of the sense winding 13. The wave form 61 illustrates the time strobe pulse supplied to the input diode 50 through the terminal 53. The wave form 63 illustrates the output of the transistor 44 for sense winding signals according to the wave form 62, and the wave form 64 illustrates the output of the sensing circuit at the terminal 52. Assuming, for example, that at the time $t_1$ the wave form *62a* is presented at the winding 13, the positive pulse occurring with a negative pulse following indicates the flux storage condition of the element 11 to be a ONE. The wave form *62a* is amplified by the differential amplifier of transistors 28 and 29 and clipped by the action of the transistor 35 to provide a pulse to the saturated switch 44. The output of the switch 44 as shown by the negative pulse of wave form *63a* occurs in time coincidence with the positive half of the wave form *62a*. Thus, the signals from the wave form *61a* and *63a* are applied respectively to the diodes 47 and 50 of the AND gate. Since the signals occur in time coincidence, the AND gate presents an output through the diode 49 to terminal 52 as indicated by the wave form *64a*. This output is indicative of a ONE stored in the element 11.

Referring to the wave form *62b*, at the time $t_2$ there is illustrated a negative pulse followed by a positive pulse indicative of a ZERO stored in the element 11. The wave form *62b* is amplified by the amplifier transistors 28 and 29. The negative half portion is clipped by the transistor 35. The transistor 44 is turned on by the positive half wave of the transistor *62b* as shown by the wave form *63b*. Since the wave form *63b* is not in time coincidence with the wave form *61b* of the strobe pulse, the pulses to the diodes 47 and 50 do not arrive in time coincidence, and the AND gate does not provide an output signal. Therefore, the signal at the output terminal 52 as shown by the wave form *64b* is essentially a ZERO signal indicating a ZERO stored in the element 11.

The sensing circuit of the invention is particularly advantageous to sense the storage condition in a magnetic element wherein the output of the sense winding is not a signal of high strength.

Although the invention has been described and illustrated in detail, it is to be clearly understood that the same is by way of illustration and example only and is not taken by way of limitation, the spirit and scope of this invention being limited only by the terms of the appended claims.

I claim:

1. In a sensing circuit for determining flux storage conditions in a block of magnetic material, said block of magnetic material having a sense winding providing a positive sine wave signal for one polarity of flux storage and a negative sine wave signal for the other polarity of flux storage, amplifier means responsively connected to said sense winding for amplifying the difference between the positive and negative halves of said sine wave signal, clamping means responsively connected to the output of said amplifier means for clipping the negative half of said sine wave signal, gating means having one input responsively connected to the output of said clamping means, and the other input responsively connected to receive a signal from a source of time strobe pulses, the signal from said time strobe pulse source being in time coincidence with the first half of said sine wave signal, whereby said gating means delivers an output when the first half of said sine wave signal is positive.

2. The sensing circuit of claim 1 wherein said gating means comprises an AND gate having two inputs respectively connected to receive signals from the output of said clamping means and said source of time strobe pulses, said AND gate providing an output signal indicative of the polarity of flux storage in said block of magnetic material.

3. In a sensing circuit for determining flux storage conditions in a block of magnetic material, sensing means for providing a substantially sine wave signal whose polarity is indicative of the polarity of flux storage in said block of magnetic material, clamping means responsive to said sensing means for clipping the negative half of said sine wave signal, pulse source means for providing a strobe pulse in time coincidence with the first half of said sine wave signal, and means responsive to said clamping means and said pulse source means for providing a signal when the first half of said sine wave signal is positive.

4. The combination recited in claim 3 wherein said last-mentioned means comprises an AND gate having two inputs, one of said inputs responsive to said clamping means, and the other of said inputs responsive to said pulse source means.

5. A sense amplifier for determining flux storage conditions in a block of magnetic material, said block of magnetic material having a sense winding providing a positive sine wave signal for one polarity of flux storage and a negative sine wave signal for the other polarity of flux storage, a differential amplifier having an input responsively connected across said sense winding for amplifying the difference between the positive and negative halves of said sine wave signal, a clamping circuit having an input responsively connected to the output of said differential amplifier for clipping the negative half of said sine wave signal, a time strobe pulse source, an AND gate having two inputs and one output, one of said inputs responsively connected to the output of said clamping circuit, the other of said inputs responsively connected to the said time strobe pulse source, said time strobe pulse source providing a strobe pulse in time coincidence with the first half of said sine wave signal, said AND gate providing pulse at said output upon coincidence of a time strobe pulse and a positive signal from said clamping circuit.

No references cited.